3,283,604
ADJUSTABLE STEERING COLUMN
Robert E. Meyers, South Bend, Ind., assignor to The Bendix Corporation, South Bend, Ind., a corporation of Delaware
Filed Nov. 13, 1963, Ser. No. 323,527
8 Claims. (Cl. 74—493)

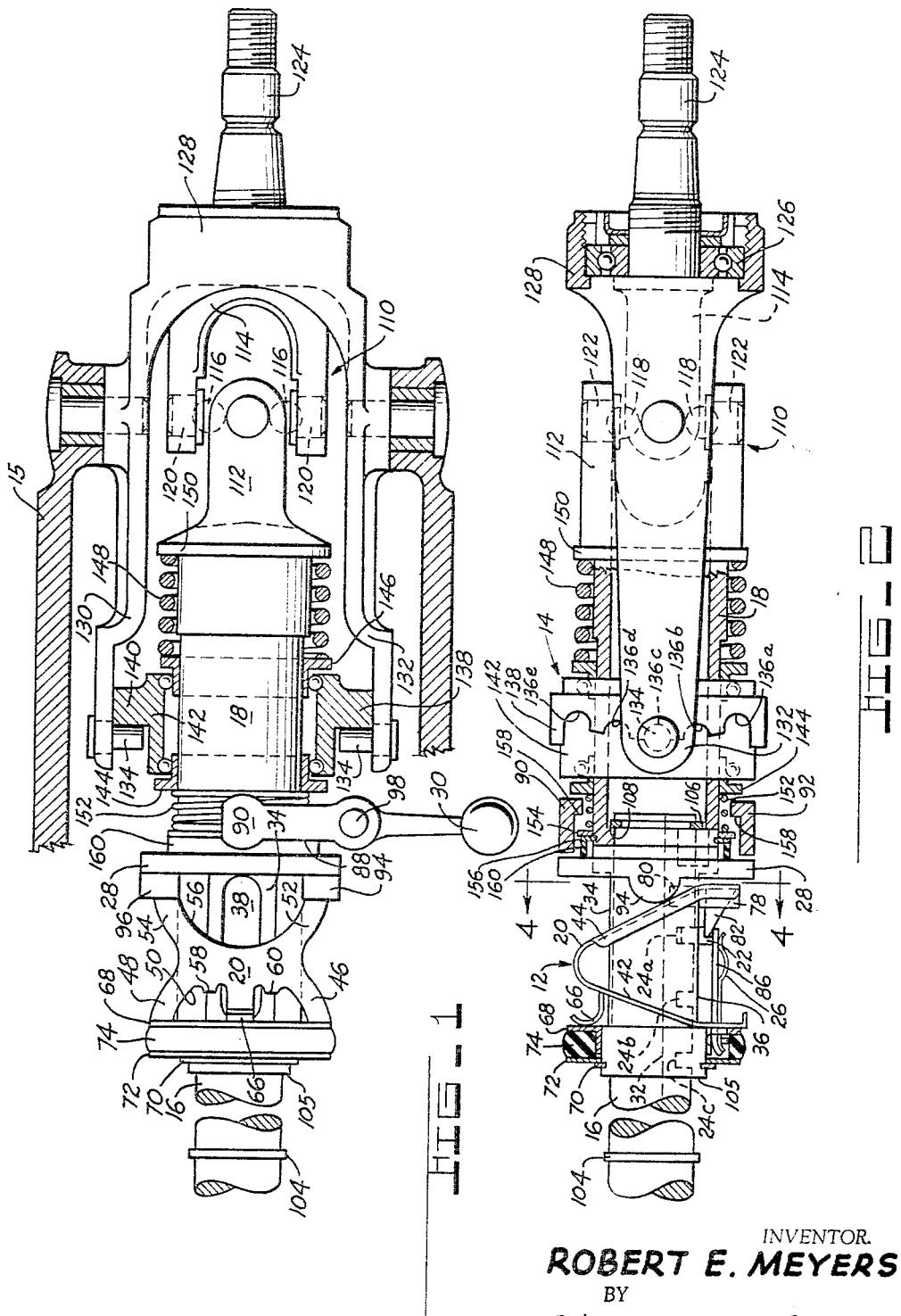

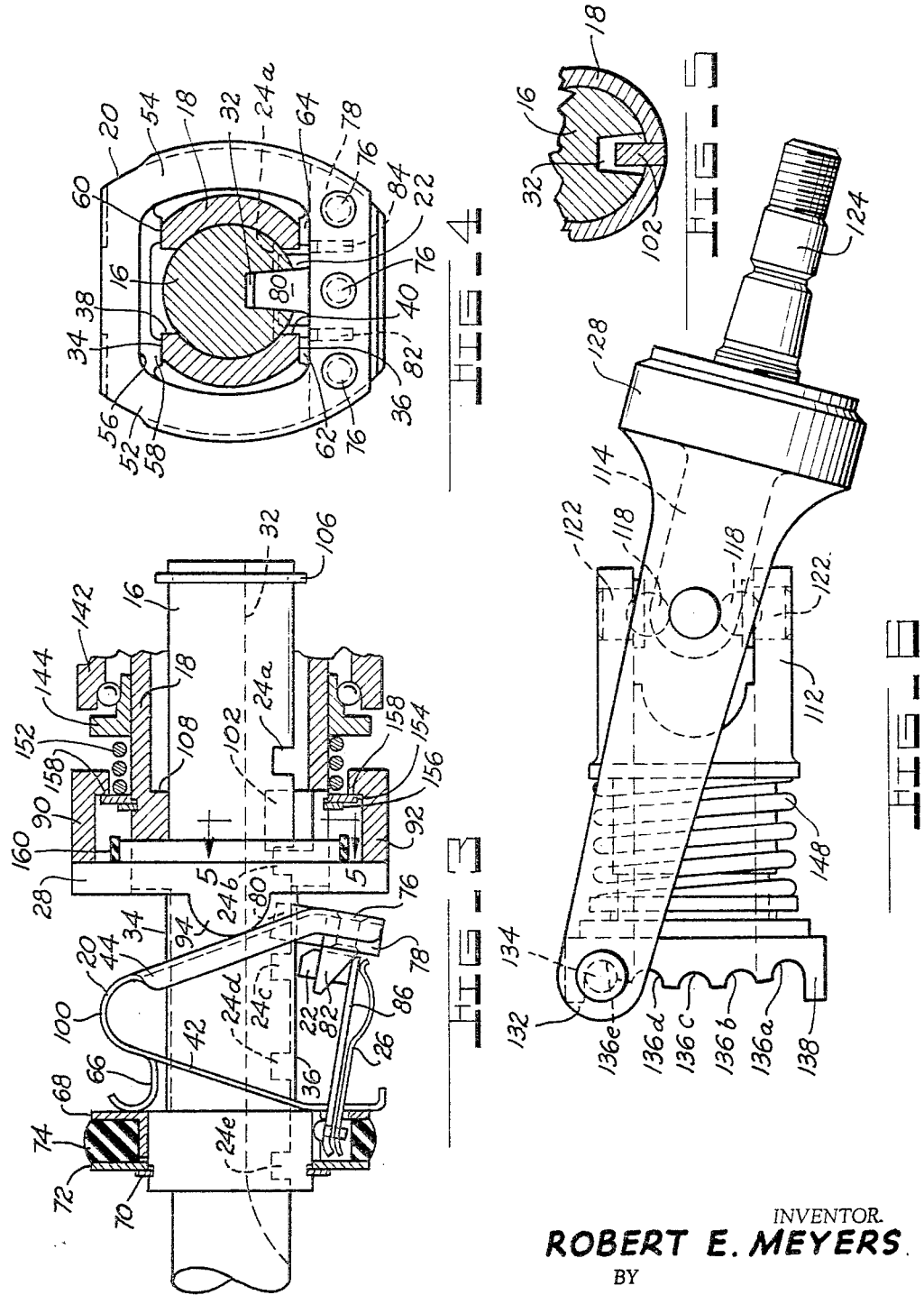

This invention relates to the steering mechanism of a vehicle and more particularly to an axially and angularly adjustable steering column.

The present practice in most vehicles is to provide an adjustable driver's seat so that the most comfortable position relative to the accelerator, brake, or other control pedals can be attained by the driver, as determined by the length of his or her legs. However, if the steering column and wheel cannot also be adjusted, the position of the steering wheel will, more often than not, be incorrect. Thus, if a short driver adjusts the seat to a forward position so that the control pedals may be reached, the steering wheel probably will be too close to the driver's body and may even touch it. On the other hand, a tall driver who has moved the seat rearwardly may find that the steering wheel is too far away for comfort.

Accordingly, it is an object of this invention to provide an axially and angularly adjustable steering column which can be positioned relative to the driver's seat so that any normal driver regardless of his girth, size, or height will be comfortable and will have full control of the vehicle.

Another object of this invention is to provide an axially and angularly adjustable steering column which may be quickly adjusted by the driver in an easy manner. A further object of this invention is to provide an axially and angularly adjustable steering column wherein the axial adjustment is controlled by moving a lever in one direction and the angular adjustment is controlled by moving the same lever in another direction.

The above and other objects and features of this invention will become apparent from the following description of the apparatus taken in connection with the accompanying drawings which form a part of this specification and in which:

FIGURE 1 is a plan view partially in section and partially in elevation which illustrates the novel adjustable steering column;

FIGURE 2 is a side view of the steering column shown in FIGURE 1 (except for the cylindrical jacket which has been removed) which is also partially in section and partially in elevation;

FIGURE 3 is an enlarged view of the actuator and latch mechanism in a position which will permit axial adjustment of the steering column;

FIGURE 4 is a sectional view taken along line 4—4 of FIGURE 2;

FIGURE 5 is a sectional view taken along line 5—5 of FIGURE 3; and

FIGURE 6 is an enlarged plan view which shows the steering column in an angularly adjusted position.

Referring to FIGURES 1 and 2, it will be seen that the steering column which is shown includes mechanism, indicated generally by the numeral 12, for permitting axial adjustment of the steering column, and also includes mechanism, indicated generally by the numeral 14, for permitting angular adjustment of the steering column. Both of these mechanisms are confined within a cylindrical jacket 15.

The mechanism for axial adjustment includes an axially fixed lower shaft 16, a hollow axially movable shaft 18 which envelops a portion of the lower shaft, a U-shaped drive spring member 20, a latch member 22 for engagement with one of five axially spaced slots 24a, 24b, 24c, 24d and 24e all of which are located on lower shaft 16, a leaf spring 26 for urging the latch member 22 into engagement with one of the axially spaced slots, an actuating collar 28, and an actuating lever 30.

An axially extending groove 32 having tapered sides, as shown in FIGURES 3 and 4, is located in the fixed lower shaft 16 and is at least of a length equal to the amount of telescoping desired between the shafts 16 and 18. The previously mentioned axially spaced slots 24a, 24b, 24c, 24d and 24e, which are located at predetermined intervals, are cut at right angles to the axial groove 32 at approximately half the depth thereof, and are symmetrically disposed on either side of the groove. The hollow movable shaft 18 has diametrically opposed portions of the cylindrical surface cut away, as shown in FIGURES 2, 3 and 4, so as to form flats 34 and 36 and two openings 38 and 40 which expose and permit access to the fixed lower shaft 16. The U-shaped drive spring member 20 in effect has two legs 42 and 44, as shown in FIGURES 2 and 3, which form the U-shape configuration. Each of these legs is bifurcated into two segments which are disposed on opposite sides of hollow movable shaft 18. The leg 42 includes bifurcated segments 46 and 48 which form opening 50, while leg 44 includes bifurcated segments 52 and 54 which form opening 56. Formed on the U-shaped drive spring member 20 between the bifurcated segments 46 and 48 of leg 42, are two sets of opposed fingers 58, 60, 62 and 64. One set of fingers 58 and 60 are located on the upper portion of the U-shaped spring 20 and engage flat 34 of the hollow movable shaft 18, while the other set of fingers 62 and 64 are located on the lower portion of the U-shaped spring 20 and engage the opposite flat 36 of the shaft 18. These sets of opposed fingers are held in wedging engagement with the flattened portions 34 and 36 of the hollow movable shaft 18 by the supplementary spring portion 66 of the leg 42 which abuts the flanged washer 68. The flanged washer is maintained in position by a snap ring 70, a flat washer 72, and an anti-rattle annular rubber cushion 74 which is confined between the flanged washer 68 and flat washer 72. Suitably attached, by means of rivets 76 or otherwise, to the lower portion of the other leg 44 of the U-shaped spring 20, is a member 78 having a tapered key 80 which is in wedging engagement with the axially extending tapered groove 32 located in the fixed lower shaft 16 due to the spring force of U-shaped spring 20. The wedging engagement of the tapered key 80 with the axially extending tapered groove 32 coupled with the wedging engagement of the two sets of opposed fingers 58, 60, 62 and 64 with the flattened portions 34 and 36 of the hollow movable shaft 18 provides zero backlash torque transmission between the shafts 16 and 18. Also formed on the member 78 are two tapered lugs 82 and 84 the tapered portions of which engage the latch plate 86 which is suitably connected to the spring 20 and flanged washer 68. Movement of these tapered lugs toward the left, as shown in FIGURE 3, will cause the latch member 22 to be withdrawn from the axially spaced slots 24 in which it is located. Thus, it will be seen that a positive lock between the shafts 16 and 18 with respect to axial or longitudinal movement is accomplished through means of the latch member 22 being held in engagement with one of the axially spaced slots 24a, 24b, 24c, 24d or 24e by the leaf spring 26.

The actuating mechanism for permitting axial adjustment between the axially fixed lower shaft 16 and the hollow axially movable shaft 18 includes the previously mentioned actuating collar 28 and actuating lever 30, and a forked actuator 88 operatively connected to the actuating lever, said forked actuator having opposed forks 90 and 92. A pair of oppositely disposed cams 94 and 96 are located on actuating collar 28.

From the foregoing, it will be understood that operation of this device to permit relative axial movement between shafts 16 and 18 can be accomplished by angularly displacing the actuating lever 30 about pivot point 98 so as to cause movement of the actuating forks 90 and 92 in a leftward direction. Since these forks abut the actuating collar 28, such leftward movement will cause the actuating collar to also move in the same direction and cause deflection of the U-shaped spring 20, as shown in FIGURE 3. More specifically, the cams 94 and 96, which are located on the actuating collar, will force leg 44 of the U-shaped spring to bend about point 100 so as to cause withdrawal of the tapered key 80 from the tapered groove 32 and thereby relieve the wedging engagement therebetween. At the same time that key 80 is being withdrawn from the groove 32, tapered lugs 82 and 84 engage the edge of the flat plate 86 and cause withdrawal of the latch member 22 from its associated axially spaced slot 24, as shown in FIGURE 3. Thus, upon leftward movement of the actuating collar 28, the mechanism which prevents relative axial movement between the lower shaft 16 and the hollow movable shaft 18 is rendered inoperable, and the movable shaft 18 can then be moved to any one of a plurality of other positions. After the shaft 18 has been moved to the desired position, release of pressure from the actuating lever 30 will permit the U-shaped spring 20 to return the actuating collar 28 and actuating lever to their neutral positions, thereby allowing the tapered key 80 to again become wedged in the tapered groove 32 and the latch member 22 to engage one of the axially spaced slots 24. It will be noted in FIGURE 2 that the latch member 22 is in engagement with slot 24a and that in FIGURE 3 the latch member 22 is in position to engage slot 24c after shaft 18 has been axially moved relative to shaft 16. A fail-safe key 102 is fixedly connected in a suitable manner to shaft 18 and extends into groove 32 of shaft 16, as shown in FIGURE 3.

Relative axial movement between the shafts 16 and 18 is limited by a snap ring 104 which functions as a lower stop member engageable by the lower end 105 and by a snap ring 106 at the upper end of shaft 16 which functions as an upper stop member engageable by internal shoulder 108 formed within hollow shaft 18.

The mechanism for angularly adjusting the steering column includes a universal joint, indicated generally by the numeral 110, of the type described and claimed in copending patent application Serial No. 304,551, now Patent No. 3,217,516 issued November 16, 1965, wherein a pair of forked members 112 and 114 are positioned at right angles with respect to each other and are coupled together by diametrically opposed balls 116 and 118 suitably retained in diametrically opposed inwardly facing socket seats 120 and 122. The lower fork 112 of the universal joint is formed on or suitably attached to the end of the axially movable hollow shaft 18, whereas the upper fork 114 of the universal joint is formed on or suitably attached to the steering shaft 124. Suitably connected to the steering shaft through means of a conventional radial thrust bearing 126 is a tilt support member 128 having two opposed arms 130 and 132. Located at the end of the arms are pins 134 which engage one set of notches 136a, 136b, 136c, 136d or 136e of diametrically opposed ratchet members 138 and 140. The ratchet members are suitably attached to a collar 142 which surrounds the shaft 18 and is supported by angular contact bearings 144 and 146 for taking radial and axial thrust. A spring 148 which abuts a flange 150 formed on forked member 112 and also abuts bearing 146 urges the collar 142 and ratchet members 138 and 140 towards the left so as to maintain the pins 134 within the desired notch 136. Another spring 152 is located between washer 154 and bearing 144. This washer, which abuts snap ring 156, not only functions as a spring retainer but also limits the stroke of the forked actuator 88 since the forks 90 and 92 thereof are formed with shoulders 158 which come into contact with the washer when the actuator is moved towards the left. A rubber anti-rattle bumper 160 is located between the actuating collar 28 and washer 154 and is suitably connected to said collar.

From the foregoing, it will be understood that operation of the device to permit angular adjustment of the steering column can be accomplished by angularly displacing the actuating lever 30 about pivot point 98 so as to cause movement of the actuating forks 90 and 92 towards the right. Such movement will cause the forks 90 and 92 of the actuator to come in contact with bearing 144 and continued movement to the right will cause the collar 142 and ratchet members 138 and 140 to be moved to a position wherein the pins 134 of the tilt support member 130 will be disengaged from the notches 136. Upon such disengagement the operator of the vehicle can move the steering shaft 124 into any one of five positions which are determined by the insertion of the pins 134 into any of the notches 136a, b, c, d or e. For example, in FIGURE 6, the pins 132 are engaged in the notches 136e.

Thus from the previous description of the adjustable steering column it will be understood that the operator of a vehicle can axially adjust the column to any one of five positions by movement of the actuating lever in one direction and can angularly adjust the column to any one of five positions by movement of the actuating lever in the opposite direction.

The several practical advantages which flow from this type of an adjustable steering column arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. An adjustable steering column comprising a first shaft having a plurality of axially spaced slots and an axially extending groove therein, a second shaft telescoped over said first shaft and movable axially with respect thereto, said second shaft having opening means therein for permitting access to said slots and groove in said first shaft, a third shaft operatively connected to said second shaft for causing rotation thereof, said operative connection including universal joint means for permitting said third shaft to be angularly positioned with respect to said second shaft, drive spring means operatively connected to said first and second shafts for transmitting rotary motion from said second shaft to said first shaft, said last mentioned operative connection including means formed on said drive spring means for gripping the surface of said second shaft and key means formed thereon for engaging the axially extending groove of said first shaft through the opening means of said second shaft to thereby prevent relative rotary motion between said first and second shafts, latch means operatively connected to said second shaft and engaging one of said axially spaced slots of said first shaft through the opening means of said second shaft for preventing axial movement between said first and second shafts, tilt support means fixedly connected to and movable with said third shaft, locking means located on said second shaft and movable with respect thereto for engaging said tilt support member and preventing a change in the angular position of said third shaft with respect to said second shaft, and manually operated actuating means capable of being moved in one direction for simultaneously causing said key means and latch means to become disengaged from said axially extending groove and said one of said axially spaced slots to thereby permit axial movement of said second shaft with respect to said first shaft or in another direction for causing movement of said locking means to a position whereby said tilt support means can be disengaged from said locking means and can be locked in another position by angularly moving said third shaft with respect to said second shaft.

2. An adjustable steering column comprising an axially fixed lower shaft having a plurality of axially spaced slots and an axially extending tapered groove therein, a hollow shaft telescoped over said lower shaft and movable axially with respect thereto, said hollow shaft having portions of the cylindrical surface thereof cut away to form diametrically opposed flats and diametrically opposed openings for permitting access to the slots and groove in said lower shaft, a steering shaft operatively connected to said hollow shaft for causing rotation thereof, said operative connection including universal joint means for permitting said steering shaft to be angularly positioned with respect to said hollow shaft, a U-shaped drive spring operatively connected to said lower shaft and said hollow shaft for transmitting rotary motion from said hollow shaft to said lower shaft, said drive spring having first and second legs each of which is bifurcated into two segments disposed on opposite sides of said hollow shaft, opposed fingers formed between the bifurcated segments of the first leg of said U-shaped spring, said fingers being held in wedging engagement with the diametrically opposed flats of said hollow shaft, a tapered key fixedly connected to the second leg of said U-shaped spring and extending through one of said diametrically opposed openings of said hollow shaft, said key being urged into wedging engagement with said axially extending tapered groove of the lower shaft by the spring force of said U-shaped spring to thereby prevent relative rotary motion between said shafts, a latch member operatively connected to said hollow shaft and extending through one of said diametrically opposed openings of said hollow shaft, said latch member being engaged in one of said axially spaced slots of said lower shaft for preventing axial movement between said shafts, spring means for maintaining said latch member in engagement with one of said axially spaced slots, tapered lug means fixedly connected to the second leg of said U-shaped spring for contacting said latch member and causing same to be disengaged from said one of said axially spaced slots upon movement of said second leg towards said first leg of said U-shaped spring, a tilt support member fixedly connected to and movable with said first shaft, said support member having two diametrically opposed arms one of which is located on one side of said hollow shaft and the other of which is located on the other side of said hollow shaft, a pin located at the end of each of said arms and extending therefrom, a collar located on said second shaft and movable with respect thereto, two diametrically opposed ratchet members, one of which is located on one side of said collar and fixedly connected thereto and the other of which is located on the other side of said collar and fixedly connected thereto, a plurality of notches located on each of said ratchet members for receiving the pins extending from the arms of said tilt support member and preventing a change in the angular position of said steering shaft with respect to said hollow shaft, and manually operated actuating means located between the second leg of said U-shaped drive spring and said collar, said actuating means being capable of being moved in one direction for causing movement of said second leg to a position whereby said tapered key and latch member are disengaged so as to permit axial movement of said hollow shaft with respect to said lower shaft or in the opposite direction for causing movement of said collar and ratchet members to a position with respect to said hollow shaft whereby said pins in the tilt support arms can be disengaged from one set of notches in said ratchet members and can be engaged in another set of notches by angularly moving said steering shaft with respect to said hollow shaft.

3. An axially adjustable steering column comprising a first shaft having a plurality of axially spaced slots and an axially extending groove therein, a second shaft telescoped over said first shaft and movable axially with respect thereto, said second shaft having opening means therein for permitting access to said slots and groove in said first shaft, manually operable means operatively connected to said hollow shaft for causing rotation thereof, drive spring means operatively connected to said first and second shafts for transmitting rotary motion from said second shaft to said first shaft, said operative connection including means formed on said drive spring means for gripping the surface of said second shaft and key means formed thereon for engaging the axially extending groove of said first shaft through the opening means of said second shaft to thereby prevent relative rotary motion between said shafts, latch means operatively connected to said second shaft and engaging one of said axially spaced slots of said first shaft through the opening means of said second shaft for preventing axial movement between said shafts, and manually operated actuating means for simultaneously causing said key means and latch means to become disengaged from said axially extending groove and said one of said axially spaced slots to thereby permit axial movement of said second shaft with respect to said first shaft.

4. An axially adjustable steering column comprising a first shaft having a plurality of axially spaced slots and an axially extending groove therein, a second shaft telescoped over said first shaft and movable axially with respect thereto, said second shaft having a portion thereof cut away from an opening for permitting access to said slots and groove in said first shaft, manually operable means operatively connected to said hollow shaft for causing rotation thereof, a drive spring operatively connected to said first and second shafts for transmitting rotary motion from said second shaft to said first shaft, said drive spring having connected first and second legs each of which is bifurcated into two segments disposed on opposite sides of said second shaft, means formed on said drive spring for gripping the surface of said second shaft, key means connected to said drive spring and extending through the opening in said second shaft, said key means being urged into engagement with said axially extending groove of said first shaft by the spring force of said drive spring to thereby prevent relative rotary motion between said shafts, latch means operatively connected to said second shaft and extending through the opening therein, said latch means being engaged in one of the axially spaced slots of the first shaft for preventing axial movement between said shafts, means for maintaining said latch means in engagement with one of said axially spaced slots, means connected to said drive spring for disengaging said latch means from said one of said axially spaced slots upon movement of one of said drive spring legs towards the other drive spring leg, and manually operated actuating means for causing movement of one of said drive spring legs towards the other of said drive spring legs so as to cause disengagement of said key means and latch means and permit axial movement of said second shaft with respect to said first shaft.

5. An axially adjustable steering column comprising an axially fixed lower shaft having a plurality of axially spaced slots and an axially extending tapered groove therein, a hollow shaft telescoped over said lower shaft and movable axially with respect thereto, said hollow shaft having portions thereof cut away to form diametrically opposed openings for permitting access to said slots and groove in said lower shaft, manually operable means operatively connected to said hollow shaft for causing rotation thereof, a U-shaped drive spring operatively connected to said lower shaft and said hollow shaft for transmitting rotary motion from said hollow shaft to said lower shaft, said drive spring having first and second legs each of which is bifurcated into two segments disposed on opposite sides of said hollow shaft, means formed between the bifurcated segments of the first leg of said U-shaped spring for gripping the surface of said hollow shaft, a tapered key fixedly connected to the second leg of said U-shaped spring and extending through one of said diametrically opposed openings of said hollow shaft, said key being urged into wedging engagement with said axially extending tapered groove of the lower shaft by the spring force of said U-shaped spring to thereby prevent relative rotary motion between said shafts, a latch member operatively connected to said hollow shaft and extending through one of said diametrically opposed openings of said hollow shaft, said latch member being engaged in one of said axially spaced slots of said lower shaft for preventing axial movement between said shafts, resilient means for maintaining said latch member in engagement with one of said axially spaced slots, lug means fixedly connected to the second leg of said U-shaped spring for contacting said latch member and causing same to be disengaged from said one of said axially spaced slots upon movement of said second leg towards said first leg of said U-shaped spring, and manually operated actuating means for causing movement of said second leg to a position whereby said tapered key and latch member are disengaged so as to permit axial movement of said hollow shaft with respect to said lower shaft.

6. An axially adjustable steering column comprising an axially fixed lower cylindrical shaft having a plurality of axially spaced slots and an axially extending tapered groove therein, a hollow cylindrical shaft telescoped over said lower shaft and movable axially with respect thereto, said hollow shaft having portions of the cylindrical surface thereof cut away to form diametrically opposed flats and diametrically opposed openings for permitting access to said slots and groove in said lower shaft, manually operable means operatively connected to said hollow shaft for causing rotation thereof, a U-shaped drive spring operatively connected to said lower shaft and said hollow shaft for transmitting rotary motion from said hollow shaft to said lower shaft, said drive spring having first and second legs each of which is bifurcated into two segments disposed on opposite sides of said hollow shaft, opposed fingers formed between the bifurcated segments of the first leg of said U-shaped spring, said fingers being held in wedging engagement with the diametrically opposed flats of said hollow shaft, a tapered key fixedly connected to the second leg of said U-shaped spring and extending through one of said diametrically opposed openings of said hollow shaft, said key being urged into wedging engagement with said axially extending tapered groove of the lower shaft by the spring force of said U-shaped spring to thereby prevent relative rotary motion between said shafts, a latch member operatively connected to said hollow shaft and extending through one of said diametrically opposed openings of said hollow shaft, said latch member being engaged in one of said axially spaced slots of said lower shaft for preventing axial movement between said shafts, spring means for maintaining said latch member in engagement with one of said axially spaced slots, tapered lug means fixedly connected to the second leg of said U-shaped spring for contacting said latch member and causing same to be disengaged from said one of said axially spaced slots upon movement of said second leg towards said first leg of said U-shaped spring, and manually operated actuating means for causing movement of said second leg to a position whereby said tapered key and latch member are disengaged so as to permit axial movement of said hollow shaft with respect to said lower shaft.

7. An angularly adjustable steering column comprising first and second shafts capable of being rotated with their axes angularly disposed with respect to one another, universal joint means operatively connecting the first of said shafts with the second of said shafts so that said first shaft can be angularly positioned with respect to said second shaft, tilt support means fixedly connected to and movable with said first shaft, said support means having two diametrically opposed arms located on opposite sides of said second shaft, collar means located on said second shaft and movable with respect thereto, ratchet means fixedly connected to said collar means, a plurality of notches located on said ratchet means for engaging the arms of said tilt support member and preventing a change in the angular position of said first shaft with respect to said second shaft, and manually operable actuating means operatively connected to said collar means for causing movement of said collar means and ratchet means with respect to said second shaft, said actuating means being adapted to move said collar means and ratchet means to a position whereby said tilt support arms can be disengaged from one notch in said ratchet means and can be engaged in another notch therein by angularly moving said first shaft with respect to said second shaft.

8. An angularly adjustable steering column comprising first and second shafts capable of being rotated with their axes angularly disposed with respect to one another, universal joint means operatively connecting the first of said shafts with the second of said shafts so that said first shaft can be angularly positioned with respect to said second shaft, a tilt support member fixedly connected to and movable with said first shaft, said support member having two diametrically opposed arms, one of which is located on one side of said second shaft and the other of which is located on the other side of said second shaft, a pin located at the end of each of said arms and extending therefrom, a collar located on said second shaft and movable with respect thereto, two diametrically opposed ratchet members, one of which is located on one side of said collar and fixedly connected thereto, and the other of which is located on the other side of said collar and fixedly connected thereto, a plurality of notches located on each of said ratchet members for receiving the pins extending from the arms of said tilt support member and preventing a change in the angular position of said first shaft with respect to said second shaft, and manually operable actuating means operatively connected to said collar for causing movement of said collar and ratchet members with respect to said second shaft, said actuating means being adapted to move said collar and ratchet members to a position whereby said pins in the tilt support arms can be disengaged from one set of notches in said ratchet members and can be engaged in another set of notches by angularly moving said first shaft with respect to said second shaft.

References Cited by the Examiner
UNITED STATES PATENTS

| | | | |
|---|---|---|---|
| 1,025,215 | 5/1912 | Stull | 74—493 |
| 1,048,748 | 12/1912 | Seaman | 74—493 |
| 1,166,458 | 1/1916 | Holwick | 74—554 |
| 1,186,957 | 6/1916 | Vincent | 74—554 |
| 2,910,887 | 11/1959 | Helms | 74—493 |
| 3,167,971 | 2/1965 | Ziegler et al. | 74—493 |
| 3,198,030 | 8/1965 | Miller et al. | 74—493 |

FRED C. MATTERN, Jr., *Primary Examiner.*

MILTON KAUFMAN, *Examiner.*

C. F. GREEN, *Assistant Examiner.*